(12) United States Patent
Phillips

(10) Patent No.: US 12,519,998 B2
(45) Date of Patent: Jan. 6, 2026

(54) SYSTEMS AND METHODS FOR CONTROLLING DISPLAY PLAYBACK VIA AN EXTENDED REALITY DEVICE

(71) Applicant: Adeia Guides Inc., San Jose, CA (US)

(72) Inventor: Christopher Phillips, Hartwell, GA (US)

(73) Assignee: Adeia Guides Inc., San Jose, CA (US)

( * ) Notice: Subject to any disclaimer, the term of this patent is extended or adjusted under 35 U.S.C. 154(b) by 288 days.

(21) Appl. No.: 17/898,934

(22) Filed: Aug. 30, 2022

(65) Prior Publication Data

US 2024/0073469 A1 Feb. 29, 2024

(51) Int. Cl.
*H04N 21/41* (2011.01)
*H04N 21/414* (2011.01)
*H04N 21/431* (2011.01)
*H04N 21/44* (2011.01)
*H04N 21/443* (2011.01)

(52) U.S. Cl.
CPC ... *H04N 21/4122* (2013.01); *H04N 21/41407* (2013.01); *H04N 21/4316* (2013.01); *H04N 21/44* (2013.01); *H04N 21/4438* (2013.01)

(58) Field of Classification Search
CPC ......... H04N 21/4122; H04N 21/41407; H04N 21/4316; H04N 21/44; H04N 21/4438
See application file for complete search history.

(56) References Cited

U.S. PATENT DOCUMENTS

| | | | |
|---|---|---|---|
| 9,100,464 | B2 | 8/2015 | Dasher et al. |
| 10,234,937 | B2 * | 3/2019 | Azmy ..................... G06F 3/016 |
| 2018/0070113 | A1 | 3/2018 | Phillips et al. |
| 2018/0176624 | A1 | 6/2018 | Phillips et al. |
| 2020/0322563 | A1 | 10/2020 | Dasher et al. |
| 2021/0243507 | A1 * | 8/2021 | DeFaria ............. H04N 21/8146 |

FOREIGN PATENT DOCUMENTS

WO 2018090060 A1 5/2018

OTHER PUBLICATIONS https://www.fiercevideo.com/tech/at-t-and-magic-leap-will-let-you-watch-four-shows-at-time.

* cited by examiner

*Primary Examiner* — Mishawn N. Hunter
(74) *Attorney, Agent, or Firm* — HALEY GUILIANO LLP

(57) ABSTRACT

Systems and methods are provided for manipulating a state or quality of playback of a content item. A field of view of an extended reality display device is identified, and an extent to which each of a plurality of displays falls within the field of view of the extended reality display device is determined, wherein the plurality of displays comprises at least one physical display. A plurality of factors are generated based on the determined extent to which the plurality of displays falls within the field of view, each factor corresponding to a different display of the plurality of displays. For at least one display of the plurality of displays, a state or quality of playback of a content item is manipulated in a manner responsive to the extent to which the at least one display falls within the field of view, based on the factor corresponding to the display.

19 Claims, 13 Drawing Sheets

SYSTEMS AND METHODS FOR CONTROLLING DISPLAY PLAYBACK VIA AN EXTENDED REALITY DEVICE

BACKGROUND

The present disclosure is directed towards systems and methods for controlling display playback via an extended reality device. In particular, systems and methods are provided herein for enabling a state or quality of playback of a content item to be manipulated in a manner responsive to the extent to which a display falls within the field of view of an extended reality display device.

SUMMARY

Content item delivery services, including terrestrial, over-the-top (OTT), streaming and video-on-demand (VOD) services, enable users to consume multiple content items at the same time. One example of when a user may wish to consume multiple content items at the same time is the consumption of content items relating to college sports. On a college gameday, there may be multiple games taking place at the same time. In order to watch all the games, some college sports fans may put multiple physical televisions in the same room, or use a tablet and/or a smart phone. In addition, some televisions have a picture in picture (PiP) mode, and some users may use the PiP mode to watch multiple games. Some televisions also enable multiple channels to be viewed in a grid type layout, which some users may use to watch multiple games. While the aforementioned examples may enable a user to consume multiple content items at the same time, none of the examples is an ideal solution. In addition to it being physically unwieldy to move multiple televisions into the same room, there tends to be a high bandwidth cost associated with consuming multiple content items on different devices at the same time. This bandwidth cost increases with time, as more content is available at ever higher resolutions including, for example, live sports in 8K at 60p. While content can be compressed, to an extent, as the compression is increased user quality of experience tends to decrease. Consuming content in a PiP mode, or via multiple channels in a grid layout, on a single television also leads to reduced user quality of experience, as the images of the different content items tend to be small, and it can be difficult to follow, for example, different plays in each of the games being consumed. Typically, users prefer to watch, for example, their main game on a single screen, rather than dividing the screen up and showing multiple games.

Extended reality devices (XR), such as augmented reality (AR), virtual reality (VR) and/or mixed reality (MR) devices enable a user to view and/or create virtual screens in different locations in a spatially mapped environment, with each screen playing a different channel. For example, these virtual screens can be video player windows, which look like a television. However, if all of the virtual screens are placed within the same field of view, it limits the resolutions on each of the screens and is effectively the same as a grid layout on a single television. An alternative is to locate virtual screens at multiple locations around, for example, a room in a user's home, allowing the user to turn their head to watch each screen; however, this can also lead to a high bandwidth cost in a similar manner to that discussed above.

To overcome these problems, systems and methods are provided herein for controlling display playback via an extended reality device.

Systems and methods are provided herein for controlling display playback via an extended reality device. In accordance with some aspects of the disclosure, a method is provided that includes identifying a field of view of an extended reality display device and determining an extent to which each of a plurality of displays falls within the field of view of the extended reality display device. The plurality of displays comprises at least one physical display. A plurality of factors is generated based on the determined extent to which the plurality of displays falls within the field of view, each factor corresponding to a different display of the plurality of displays. For at least one display of the plurality of displays, a state or quality of playback of a content item is manipulated in a manner responsive to the extent to which the at least one display falls within the field of view, based on the factor corresponding to the display.

In an example system a user wearing an extended reality device initiates an application for watching multiple sporting events at the same time. In this example, the user is watching five sporting events. The extended reality device identifies a physical television that is in the room and generates four additional, virtual, displays. A field of view of the extended reality device is identified and, based on where the user is looking, it is determined to what extent each of the five displays (in this example, one physical and four virtual, though other examples may comprise any number of physical displays) falls within the field of view of the extended reality device. In this example, the physical television falls fully within the field of view, as do two of the virtual displays. Two of the virtual displays fall outside of the field of view. Factors are generated based on this identifying, for example, a binary indication of whether a display falls within the field of view is generated. In this example, the state of playback of the displays that fall outside of the field of view is manipulated to be time shifted for displays that have time shift enabled. A user may be able to select whether to enable time shift for each of the plurality of displays.

The plurality of displays may comprise only physical displays or may comprise a virtual display generated by the extended reality device. The extended reality display device may comprise an optical see-through component, and a physical display of the plurality of displays may fall within the field of view and may be visible by way of the optical see-through component. The extended reality display device may comprise a video see-through component, and a physical display of the plurality of displays may fall within the field of view and may be visible by way of the video see-through component.

Generating the plurality of factors may further comprise generating, for each display of at least a subset of the plurality of displays, a binary value that indicates whether the display falls within the field of view. In another example, generating the plurality of factors may further comprise generating, for each display of at least a subset of the plurality of displays, an offset angle between a center of focus of the extended reality display device and the display. For each display of at least a subset of the plurality of displays, a distance from the extended reality display device to the display may be determined, and generating the plurality of factors may further comprise, for each display, generating a factor based on the determined distance. In another example, for each display of at least a subset of the plurality of displays, a bitrate of a content item playing at the display may be determined, and generating the plurality of factors may further comprise, for each display, generating a factor based on the determined bitrate. In another example, for each display of at least a subset of the plurality of displays, the content item bandwidth allocation to the display may be changed based on the extent to which the display falls within the field of view based on the factor corresponding to the display.

Manipulating a state or quality of playback of a content item at a display may further comprise receiving a manifest file identifying a maximum quality for a content item segment. The maximum quality may be based on the extent to which the display falls within the field of view based on the factor corresponding to the display. A virtual user interface may be generated for display at the extended reality device. In another example, for each display of at least a subset of the plurality of displays, a virtual label may be generated for display at the extended reality device, the virtual label indicating the state of playback of the content item. At least one of the plurality of displays may be configured to output a content item comprising a stream from a video conference.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which.

Figure 11:
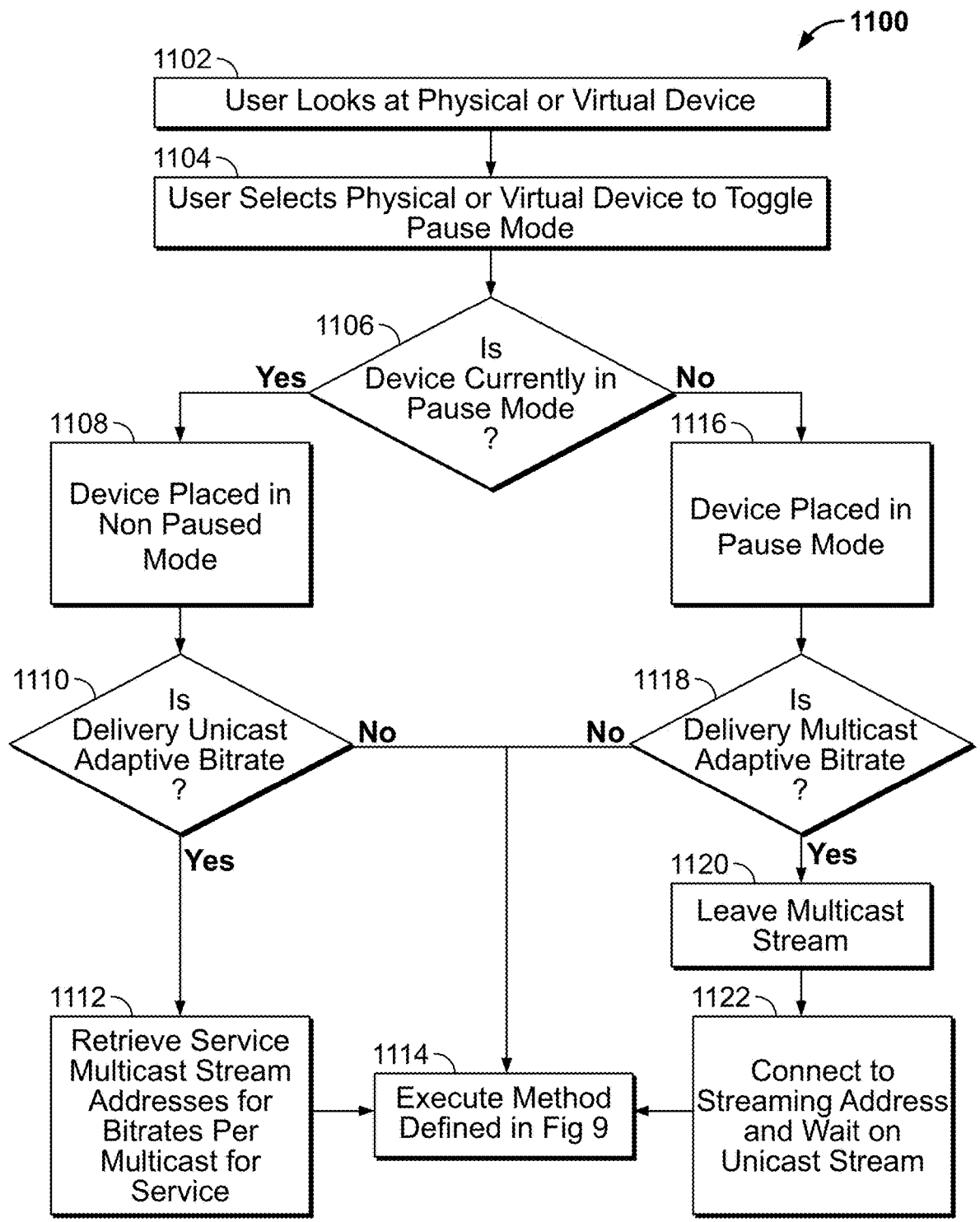
Figure 12:
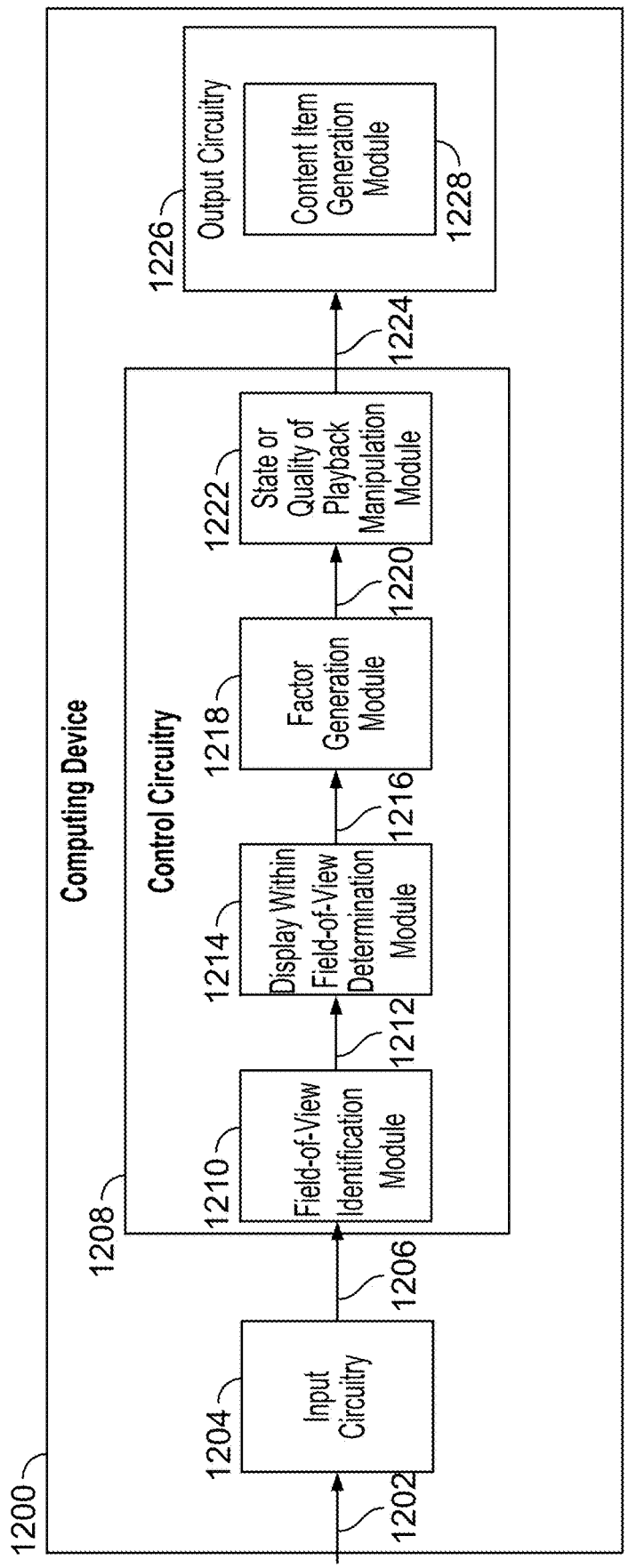

FIG. 11 shows another flowchart of illustrative steps involved in controlling display playback via an extended reality device, in accordance with some embodiments of the disclosure; and FIG. 12 shows a block diagram representing computing device components and dataflow therebetween for controlling display playback via an extended reality device, in accordance with some embodiments of the disclosure.

DETAILED DESCRIPTION

Systems and methods are described herein for controlling display playback via an extended reality device. An extended reality device includes any computing device that enables the physical world to be augmented with one or more virtual objects and/or enables physical and virtual objects to interact with one another. Extended reality devices include augmented reality devices and mixed reality devices. Virtual reality devices that enable physical objects to passthrough into a virtual world are also contemplated. A display includes both physical and virtual displays and is anything that is capable of generating and displaying an image and/or video from an input. A physical display typically includes the screens of devices such as televisions, computer monitors, tablets and smartphones. A virtual display is anything that is generated by an extended reality device for displaying an image and/or video from an input. The input may, for example, be a content item stream wirelessly received at a radio and/or receiver of the extended reality device. A virtual display may comprise solely the output generated from a content item, for example, a borderless video projected onto the physical world. In another example, a virtual display may comprise one or more virtual elements to make the virtual display appear in a similar manner to a traditional display, such as a television.

Manipulating a state of a content item includes changing anything that relates to the playback of the content item. For example, the state of a content item may be manipulated from a "play" state to a "time shift" state, a "pause" state, a "fast-forward" state, a "rewind" state, and/or a "play half speed" state, or any combination of these different states. Manipulating the quality of a content item includes requesting a different, or changing the, resolution and/or bandwidth of a content item and/or a segment of a content item.

A content item includes audio, video, text and/or any other media content. A content item may be a single media content item. In other examples, it may be a series (or season) of episodes of media content items. Audio includes audio-only content, such as podcasts. Video includes audio-visual content such as movies and/or television programs. Text includes text-only content, such as event descriptions. One example of a suitable media content item is one that complies with an adaptive bitrate standard, such as the MPEG DASH or the HLS standards. An OTT, streaming and/or VOD service (or platform) may be accessed via a website and/or an app running on a computing device, and the device may receive any type of content item, including live content items and/or on-demand content items. Content items may, for example, be streamed to physical computing devices. In another example, content items may, for example, be streamed to virtual computing devices in, for example, an augmented environment, a virtual environment and/or the metaverse.

The disclosed methods and systems may be implemented on one or more computing devices. As referred to herein, the computing device can be any device comprising a processor and memory, for example, a television, a smart television, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, a smartwatch, a smart speaker, an augmented reality device, a mixed reality device, a virtual reality device, or any other television equipment, computing equipment, or wireless device, and/or combination of the same.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, floppy disk, USB drive, DVD, CD, media cards, register memory, processor caches, random access memory (RAM), etc.

Figure 1:
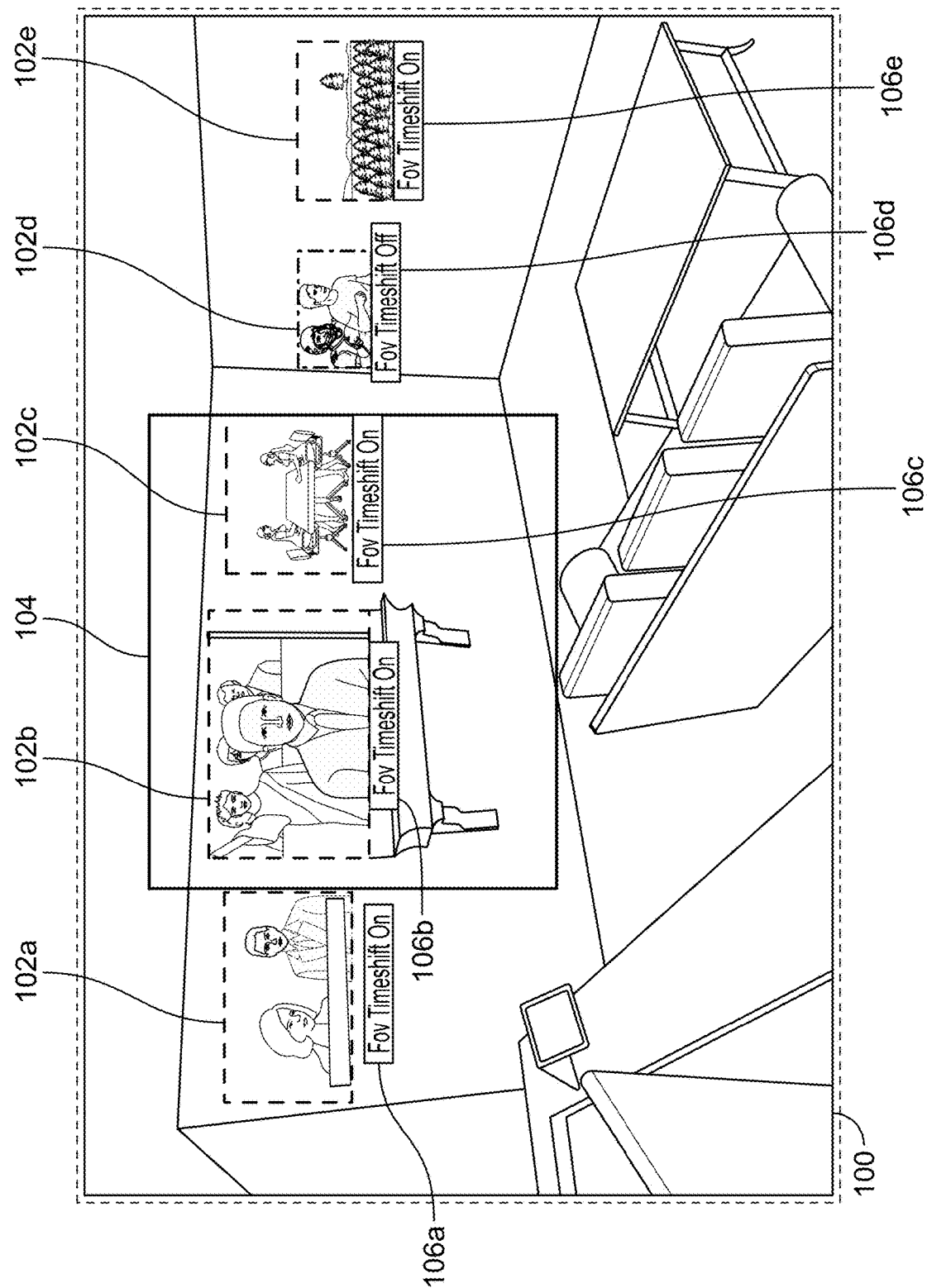
FIG. 1 shows an example environment in which display playback is controlled via an extended reality device, in accordance with some embodiments of the disclosure.

FIG. 1 shows an example environment in which display playback is controlled via an extended reality device, in accordance with some embodiments of the disclosure. The environment 100 is an example of a spatially mapped room that comprises two physical displays 102a, 102b and three virtual displays 102c, 102d, 102e. The area indicated by box 104 is an example field of view of a head-mounted extended reality device, which is based on the position of the user's head. In some examples, the extended reality device may comprise means for eye tracking, which may to determine where the user is looking in the field of view. Any generated factors and/or weights may be generated, at least in part, on where the user is looking in the field of view. In this example, both physical display 102b and virtual display 102c fall within the field of view and play back respective content items, for example a live television stream, a time-shifted television stream and/or a VOD stream. Physical display 102a and virtual displays 102d and 102e fall outside of the field of view. In this example, physical display 102a receives a content item via VOD or via a live television stream. A weight of 0 is applied to physical display 102a, and the content item associated with physical display 102a is paused, in the case of a VOD stream, or is paused via time shift in the case of a live television stream. Virtual display 102d receives a content item via live multicast adaptable bitrate stream or an OTT stream. In this example, a weight of 0 is applied to the virtual display 102d; however, time shift is not available for this display, and the quality of the content item is reduced. Virtual display 102e receives a content item via live multicast adaptable bitrate stream or an OTT stream. A weight of 0 is applied to physical display 102a and the content item associated with physical display 102a is paused, in the case of a VOD stream, or is paused via time shift in the case of a live television stream.

The extended reality device also applies virtual labels 106a, 106b, 106c, 106d, 106e to each of the displays 102a, 102b, 102c, 102d, 102e. The virtual labels 106a, 106b, 106c, 106d, 106e indicate information. The information, in this example, relates to whether field-of-view time shift is turned on or off for each of the displays 102a, 102b, 102c, 102d, 102e. In some examples, in addition to, or instead of, virtual labels 106a, 106b, 106c, 106d, 106e, a border may be applied to each of the displays that indicates information such as whether field-of-view time shift is turned on or off for each of the displays 102a, 102b, 102c, 102d, 102e. The borders may indicate different statuses of the displays via color and/or via different line patterns and/or thicknesses. In some examples, the labels and/or borders may be selectable to enable or display a playback status of the display, for example, to enable and/or disable time shift for a display. In some examples, the weights may be based on the size of a display and/or the distance of a display from the extended reality device.

As with any of the example environments and systems described herein, on spatially mapping a room, the extended reality device may generate one or more virtual displays. In some examples, the extended reality device automatically determines where to place the one or more virtual displays in the room, for example, with respect to a physical display. In other examples, a user provides input to the extended reality device in order to manually place the one or more virtual displays. In further examples, the extended reality device may provide the user with choices of where to place the one or more virtual displays in the room and/or enable a user to "snap" the position of virtual display, to aid with optimal placement of the virtual display.

Figure 2:
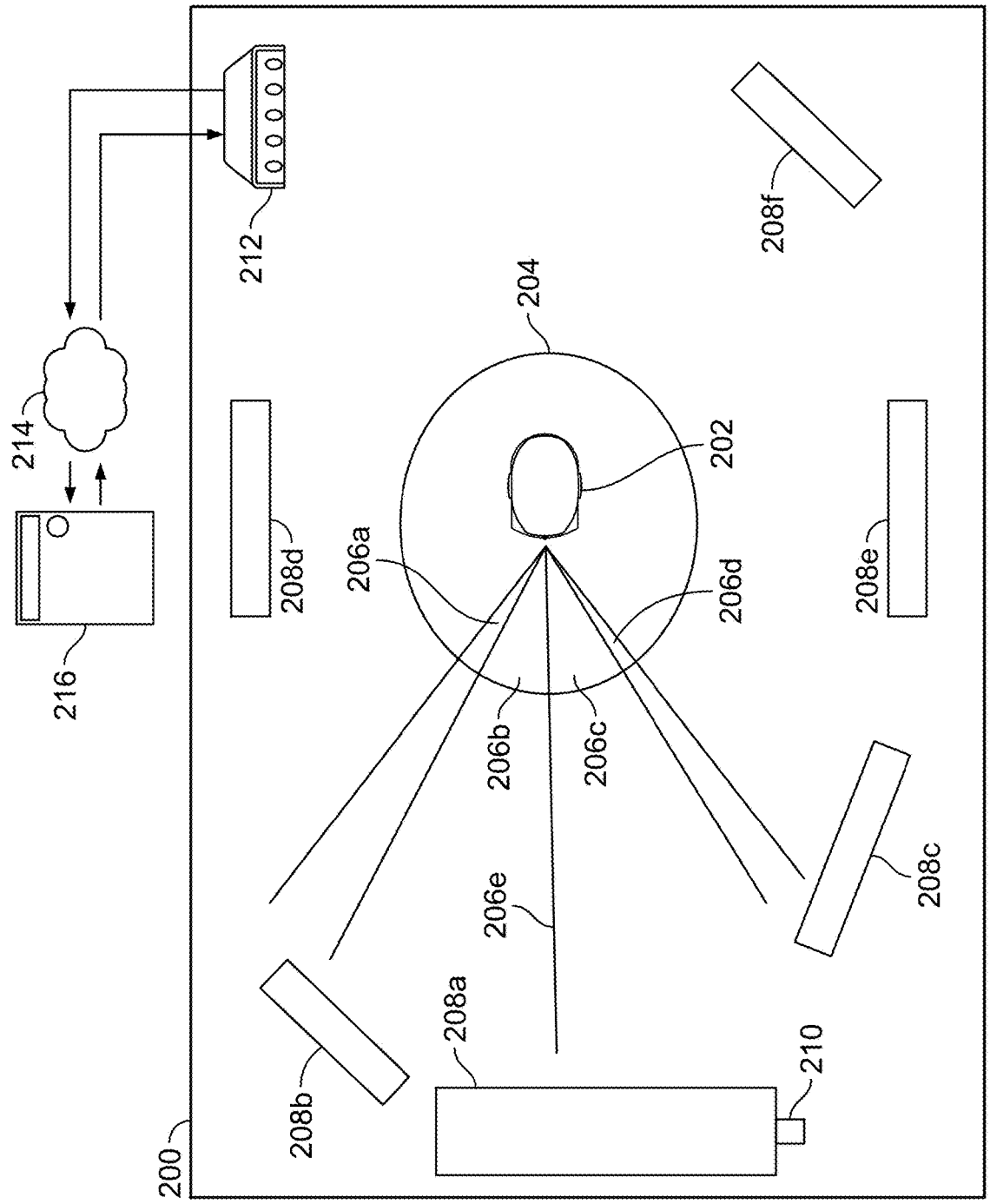
FIG. 2 shows another example environment in which display playback is controlled via an extended reality device, in accordance with some embodiments of the disclosure.

FIG. 2 shows another example environment in which display playback is controlled via an extended reality device, in accordance with some embodiments of the disclosure. The environment comprises a room 200. The room 200 comprises an extended reality device, such as augmented reality device 202, a physical television 208a, virtual televisions 208b, 208c, 208d, 208e, 208f and a smart television device 210 that does not comprise a display. In addition, a modem 212 transmits content and data to and from the devices 202, 208a, 208b, 208c, 208d, 208e, 208f via network 214 to a server 216. The room 200 is spatially mapped by the augmented reality device 202, and any physical devices, such as television 208a and device 210 are identified. In addition, the augmented reality device 202 generates a plurality of virtual displays 208b, 208c, 208d, 208e, 208f, which are virtually placed around the room 200. Typically, a user wearing augmented reality device 204 may move freely around the room and/or in a 360° circle 204. Any virtual displays may be static and/or move as the user moves. The augmented reality device has a field of view, in this example, comprising segments 206a, 206b, 206c, 206d, in which virtual devices can be generated and displayed and physical devices can be detected. Typically, the field of view of an augmented reality device 202 is smaller than that of the user. Each of the physical devices 202, 208a, 210, including the augmented reality device, may receive content items directly via, for example, a cable connection and/or via one or more applications running on the devices 202, 208a, 210, for example via an application of an OTT provider.

The augmented reality device 202 determines an extent to which each of the plurality of displays falls within the field of view of the extended reality display device. In some examples, this may be determined at an operating system level at the augmented reality device 202. In other examples, this may be determined via an application running on the augmented reality device 202. In some examples, this may be determined remote from the augmented reality device, for example at server 216. A plurality of factors are generated based on the determined extent to which of the displays 208a, 208b, 208c, 208d, 208e, 208f fall within the field of view defined by segments 206a, 206b, 206c, 206d, each factor corresponding to a different display of the plurality of displays. For example, a weighting of one may be assigned to displays that fall within the field of view of the augmented reality device 202, and a weighting of zero may be assigned to displays that fall outside of the field of view of the augmented reality device 202. In this example, displays 208a, 208b and 208c may be assigned a weighting of one, and displays 208d, 208e and 208f may be assigned a weighting of zero. In another example, the weightings may not be binary and may be any value, based on any number of different factors, such as to what extent a display falls within the field of view of the extended reality device and/or the viewing angle of a display compared to a normal line 206e, within the field of view of the extended reality device (e.g., a weighting may be based on which of the segments 206a, 206b, 206c, 206d that a display falls in). For at least one display of the plurality of displays, a state or quality of playback of a content item is manipulated in a manner responsive to the extent to which the at least one display falls within the field of view, based on the factor corresponding to the display. For example, playback on virtual displays 208d, 208e and 208f may be paused because they have a weighting of zero associated with them. In this manner, the bandwidth that was originally occupied by those devices is now available for delivering content items to the devices within the field of view of the augmented reality device 202, including any physical displays that fall within the field of view of the extended reality device. In some examples, the quality of content items may be reduced based on the factors, or weights. For example, the quality of the content items delivered to displays 208b and 208c may be reduced because they fall within the peripheral segments 206a, 206d. In some examples, pausing a content item may comprise pausing a content item via time shift and/or receiving a content item via VOD and pausing the VOD content item. The factors, or weights, may be updated in response to a detected movement, such as a head movement and/or eye movement, of the user, at regular periods and/or in response to a received trigger, such as a command from a server.

In some examples, physical display 208a may by an 8K smart television, virtual display 208b may be a virtual 40-inch television, virtual display 208c may be a virtual 60-inch television, virtual display 208d may be a virtual 50-inch television, virtual display 208e may be a virtual 46-inch television, and virtual display 208f may be a virtual 32-inch television. Although only one physical display 208a is shown in this example, any number of physical devices may be used. The modem 212 may be a 5G fixed wireless access, cable or digital subscriber line modem that is connected to the augmented reality device 202, the physical television 208a and/or the smart television device 210 via Wi-Fi and/or wired means. Data that is transmitted to and from the model to the devices 202, 208a, 210 includes content item data, play requests and/or pause requests from each of the physical and/or virtual devices. In some examples, the extended reality device may utilize eye tracking to determine which display, or displays, the user is looking at. This may be achieved by tracking an angle between the direction a user's eye is looking and one or more points on a spatial map of the room 200. In some examples, each of the displays 208a, 208b, 208c, 208d, 208e, 208f may have a spatial central point of reference assigned to it, for example, spatial tag coordinates located at the center of the physical and/or virtual displays, which may be used to determine whether or not a display falls within the field of view of an extended reality device. In other examples, the entire width of a display may be used to determine whether or not a display falls within the field of view of the extended reality device. In some examples, different weights may be assigned depending on whether the device falls within a particular segment of the field of view of the augmented reality device 202. For example, peripheral segments 206a and 206d may have a lower weight, for example, a weight of 2.5, associated with them than central segments 206b and 206c, for example, a weight of five.

In some examples, segment 206a may be associated with a viewing angle of 26°-36° with respect to normal line 206e. Segment 206b may be associated with a viewing angle of 0°-25° with respect to normal line 206e. Segment 206c may be associated with a viewing angle of 335°-359° with respect to normal line 206e. Segment 206d may be associated with a viewing angle of 324°-334° with respect to normal line 206e. These angles for the field of view could change, or be calculated, based on the user's augmented reality device 202 field of vision. For example, augmented reality virtual displays may only be seen within the augmented reality display viewport, which may be very narrow for augmented reality head-mounted displays. The field of view see-through portion of the augmented reality display may be much greater than the augmented reality device rendering viewport. For range calculations involving a physical display, generated factors, or weights, may be increased by applying a physical device factor range offset, or have a totally different range metric, to take into account the different in fields of view. For example, a different field-of-view angle may be utilized for assessing where the spatial anchor for physical displays falls in the field of view, for example by increasing the angle by 15°-25°, or more, for physical displays.

In some examples, the factors, or weightings, may also be determined based on a distance of the display 208a, 208b, 208c, 208d, 208e, 208f from the augmented reality device 202. The distance may be a physical and/or spatial (virtual) distance. The distance of the display from the augmented reality device 202 may be combined with the position of the display within the field of view of the augmented reality device 202 to generate a factor, or weighting. An application programming interface (API) may be utilized to enable the augmented reality device 202 to identify, and control, content items playing on the different displays 208a, 208b, 208c, 208d, 208e, 208f and device 210. Such an API may be provided via the device itself and/or via an application provider, such as an OTT service provider.

Figure 3:
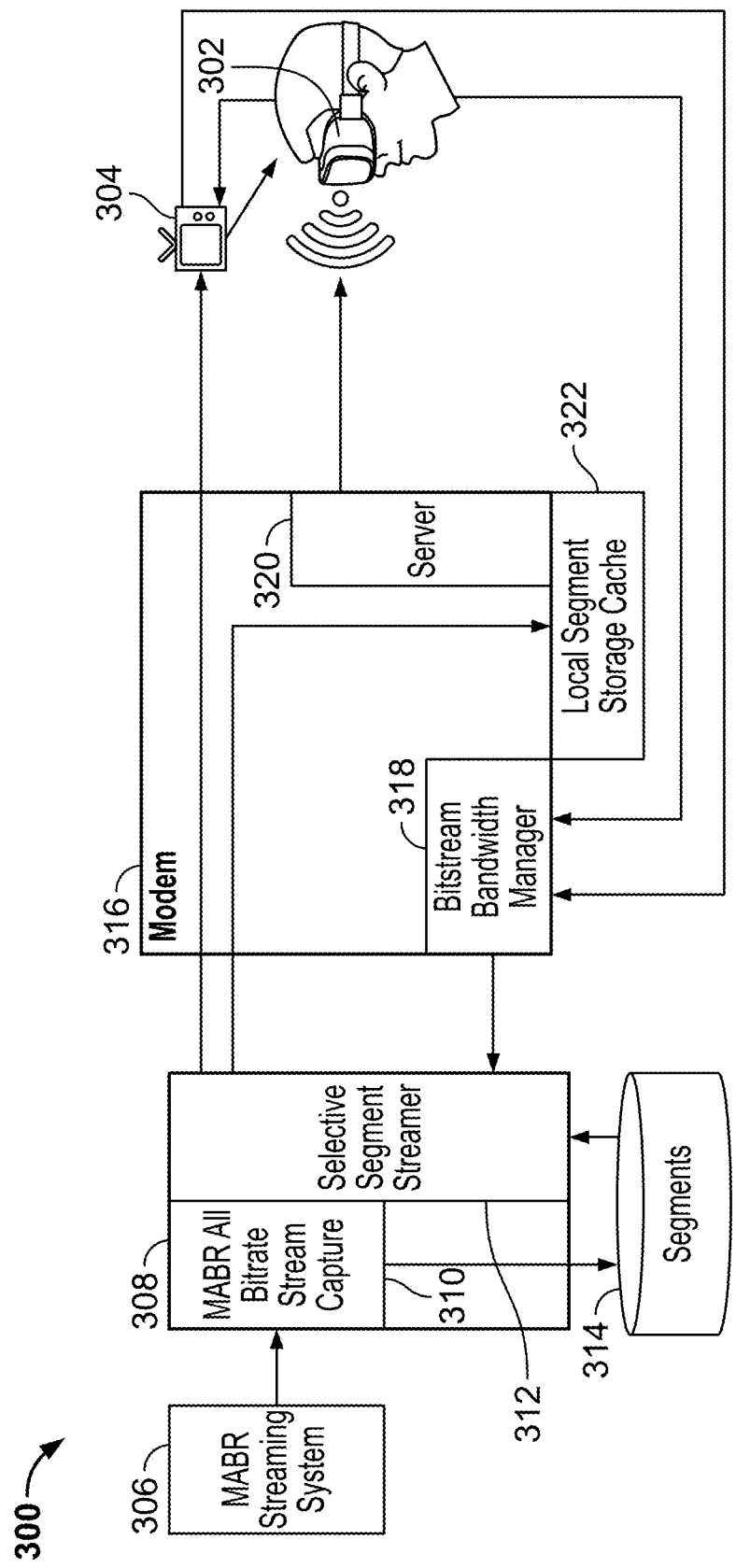
FIG. 3 shows another example environment in which display playback is controlled via an extended reality device, in accordance with some embodiments of the disclosure.

FIG. 3 shows another example environment in which display playback is controlled via an extended reality device, in accordance with some embodiments of the disclosure. Environment 300 comprises an extended reality device 302, a physical television 304, a multicast adaptive bitrate (MABR) streaming system 306, a unicast adaptive bitrate (UABR) streaming system 308, a database 314 and a modem 316. In some examples, the modem may be a router in addition to, or instead of, a modem. As described above, the physical television 304 receives a content item stream that can be controlled via extended reality device 302. The physical television 304 may comprise a digital decoder, or content streams may be decoded via a secondary device that is connected to the physical television 304, such as a cable or IPTV set-top box. Bandwidth may be managed via a suitable algorithm, such as one defined for UABR management. In addition, the extended reality device 302 receives content item streams that are used to generate virtual displays via multiple decoders, with each virtual display having, for example, its own audio and video decoder.

MABR streaming system 306 streams a plurality of channels to UABR streaming system 308. At UABR streaming system 308, an MABR all-bitrate stream capture 310 receives the streams and stores the stream segments, at all bitrates, at database 314, for use in MABR time shift, or VOD. Selective segment streamer 312 transmits content item streams for the physical and virtual displays to modem 316. In some examples, these may be time shift television, or VOD, streams that utilize a real-time streaming protocol (RTSP) for controlling, for example, pause and/or trick modes, and/or a real-time transport protocol (RTP) to transmit the streams. The content item stream for the physical television 304 is delivered directly to physical television 304, via modem 316. The streams for the virtual displays are delivered via local segment storage cache 322, which may be a moving picture experts group (MPEG) dynamic adaptive streaming over HTTP (DASH) common media application format (CMAF) compliant local segment storage cache and server 320, which may be an HTTP server. Factors, or weights, are generated at the extended reality device 302 in the manner described in connection with FIG. 2, and pause requests and/or quality change requests are transmitted via bitstream bandwidth manager 318. The bandwidth manager 318 may be an MABR and UABR bitstream bandwidth manager, to selective segment streamer 312, which actions the request by transmitting an updated content item stream to the relevant device. This may comprise changing the quality of a stream, pausing a stream and/or resuming a stream. Requests may be transmitted from the extended reality device 302 via a suitable API that is provided by, for example, an OTT operator; such requests may be transmitted to a backend system for controlling the switching of a stream from a live mode to a pause mode. A stream that is paused may have a weight of zero associated with it.

Figure 4:
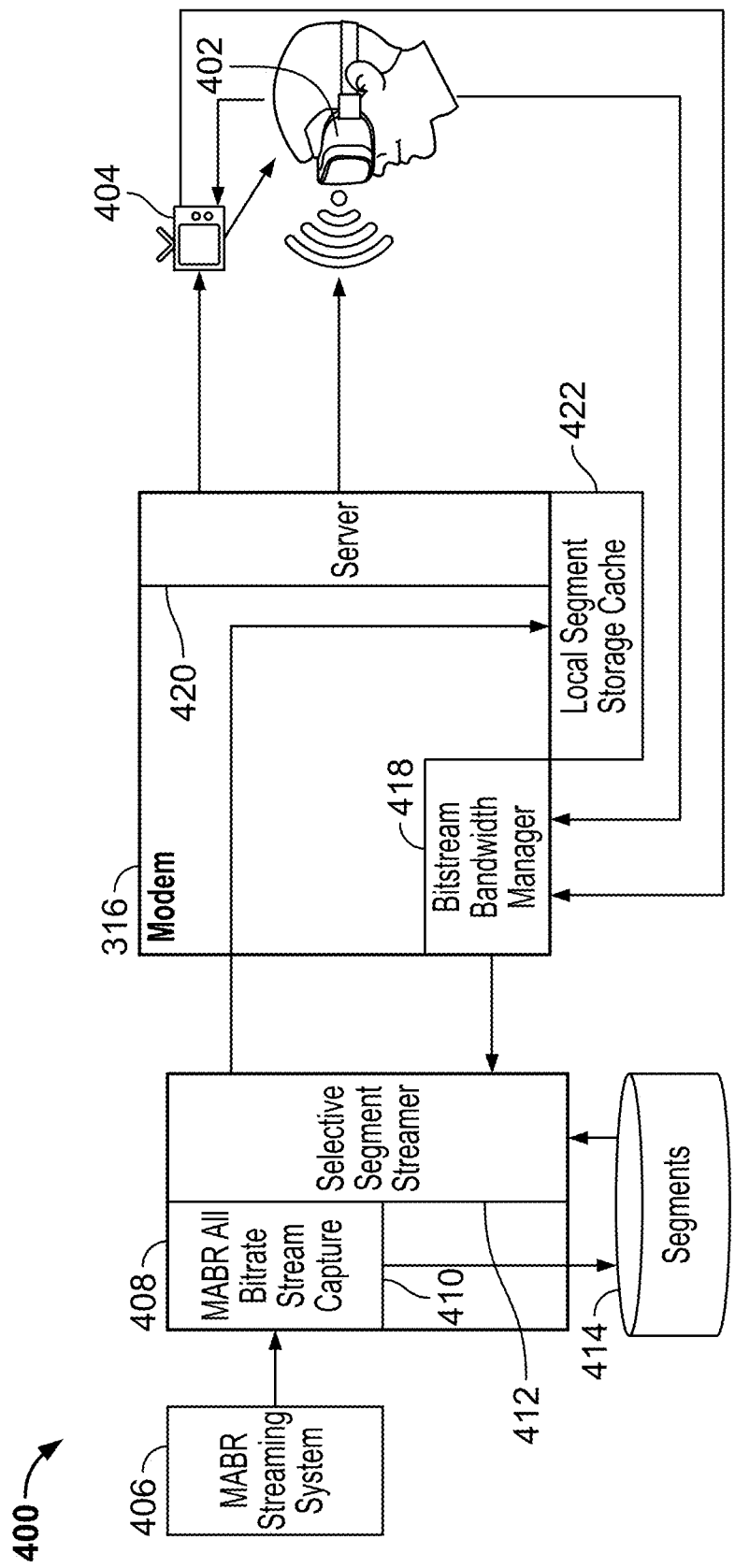
FIG. 4 shows another example environment in which display playback is controlled via an extended reality device, in accordance with some embodiments of the disclosure.

FIG. 4 shows another example environment in which display playback is controlled via an extended reality device, in accordance with some embodiments of the disclosure. Environment 400 comprises an extended reality device 402, a physical television 404, a multicast adaptive bitrate (MABR) streaming system 406, a unicast adaptive bitrate (UABR) streaming system 408, a database 414 and a modem 416. As described above, the physical television 404 receives a content item stream that can be controlled via extended reality device 402. The physical television 404 may run an application, such as an OTT application, or may be connected with a display-less OTT streaming device, such as an. Amazon Fire TV Stick. Bandwidth may be managed via a suitable algorithm, such as one defined for UABR management. In addition, the extended reality device 402 receives content item streams that are used to generate virtual displays.

MABR streaming system 406 streams a plurality of channels to UABR streaming system 408. At UABR streaming system 408, an MABR all-bitrate stream capture 410 receives the streams and stores the stream segments, at all bitrates, at database 414, for use in MABR time shift, or VOD. Selective segment streamer 412 transmits content item streams for the physical and virtual displays to modem 416. In some examples, the modem may be a router in addition to, or instead of, a modem. In some examples, these may be time shift television, or VOD, streams that utilize a real-time streaming protocol (RTSP) for controlling, for example, pause and/or trick modes, and/or a real-time transport protocol (RTP) to transmit the streams. The streams for delivery to the physical television 404 (or the device connected to the physical television 404) and the extended reality device 402, for the virtual displays, are delivered via local segment storage cache 422. The local segment storage cache 422 may be a moving picture experts group (MPEG) dynamic adaptive streaming over HTTP (DASH) common media application format (CMAF) compliant local segment storage cache and server 420, which may be an HTTP server. Factors, or weights, are generated at the extended reality device 402 in the manner described in connection with FIG. 2, and pause requests and/or quality change requests are transmitted via bitstream bandwidth manager 418. The bitstream bandwidth manager 418 may be an MABR and UABR bitstream bandwidth manager, to selective segment streamer 412, which actions the request by transmitting an updated content item stream to the relevant device. This may comprise changing the quality of a stream, pausing a stream and/or resuming a stream. Requests may be transmitted from the extended reality device 402 via a suitable API, which is provided by, for example, an OTT operator; such requests may be transmitted to a back-end system for controlling the switching of a stream from a live mode to a pause mode. A stream that is paused may have a weight of zero associated with it.

Figure 5:
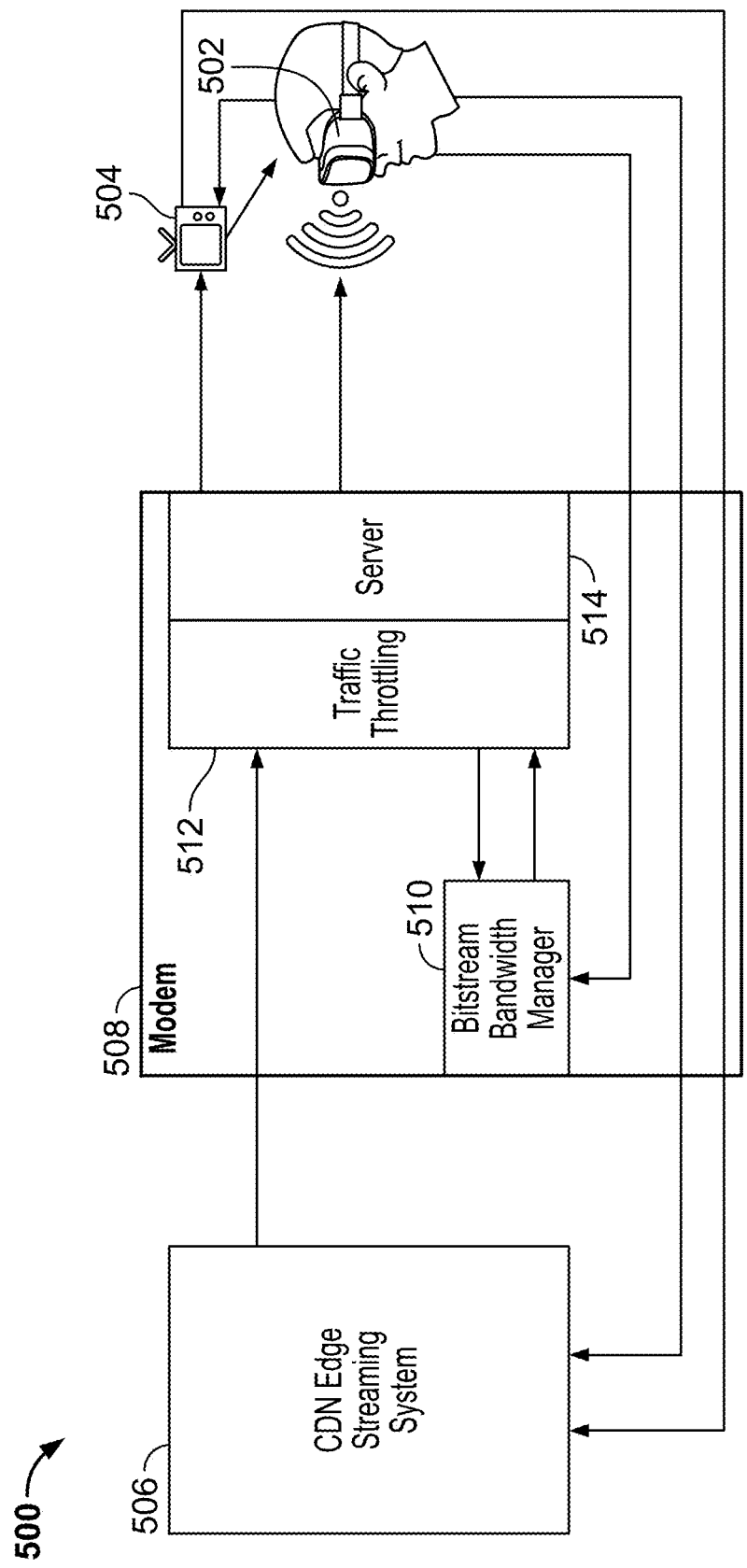
FIG. 5 shows another example environment in which display playback is controlled via an extended reality device, in accordance with some embodiments of the disclosure.

FIG. 5 shows another example environment in which display playback is controlled via an extended reality device, in accordance with some embodiments of the disclosure. Environment 500 comprises an extended reality device 502, a physical television 504, a content delivery network (CDN) edge streaming system 506 and a modem 508. In some examples, the modem may be a router in addition to, or instead of, a modem. As described above, the physical television 504 receives a content item stream that can be controlled via extended reality device 502. The physical television 504 may run an application, such as an OTT application, or may be connected with a display-less OTT streaming device, such as an Amazon Fire TV Stick. Bandwidth may be managed via a suitable algorithm, such as one for managing flow control for OTT devices. In addition, the extended reality device 502 receives content item streams that are used to generate virtual displays.

CDN edge streaming system 506 streams a plurality of channels, each channel comprising a plurality of segments, to modem 508. At modem 508, traffic throttling module 512 is implemented, and the segments are transmitted to server 514, which may be an HTTP server. The streams are transmitted from the server 514 to the physical television 504 (or the device connected to the physical television 504) and the extended reality device 502, for the virtual displays. Factors, or weights, are generated at the extended reality device 502 in the manner described in connection with FIG. 2. Pause requests are transmitted to the CDN edge streaming system 506, where they are actioned. Quality change requests are transmitted to bitstream bandwidth manager 510, which resides in modem 508. These quality change requests are transmitted to traffic throttling module 512, where they are actioned. The traffic throttling module 512 may also take into account additional throttling instructions, for example, an upper bandwidth limit set by a service provider.

Figure 6:
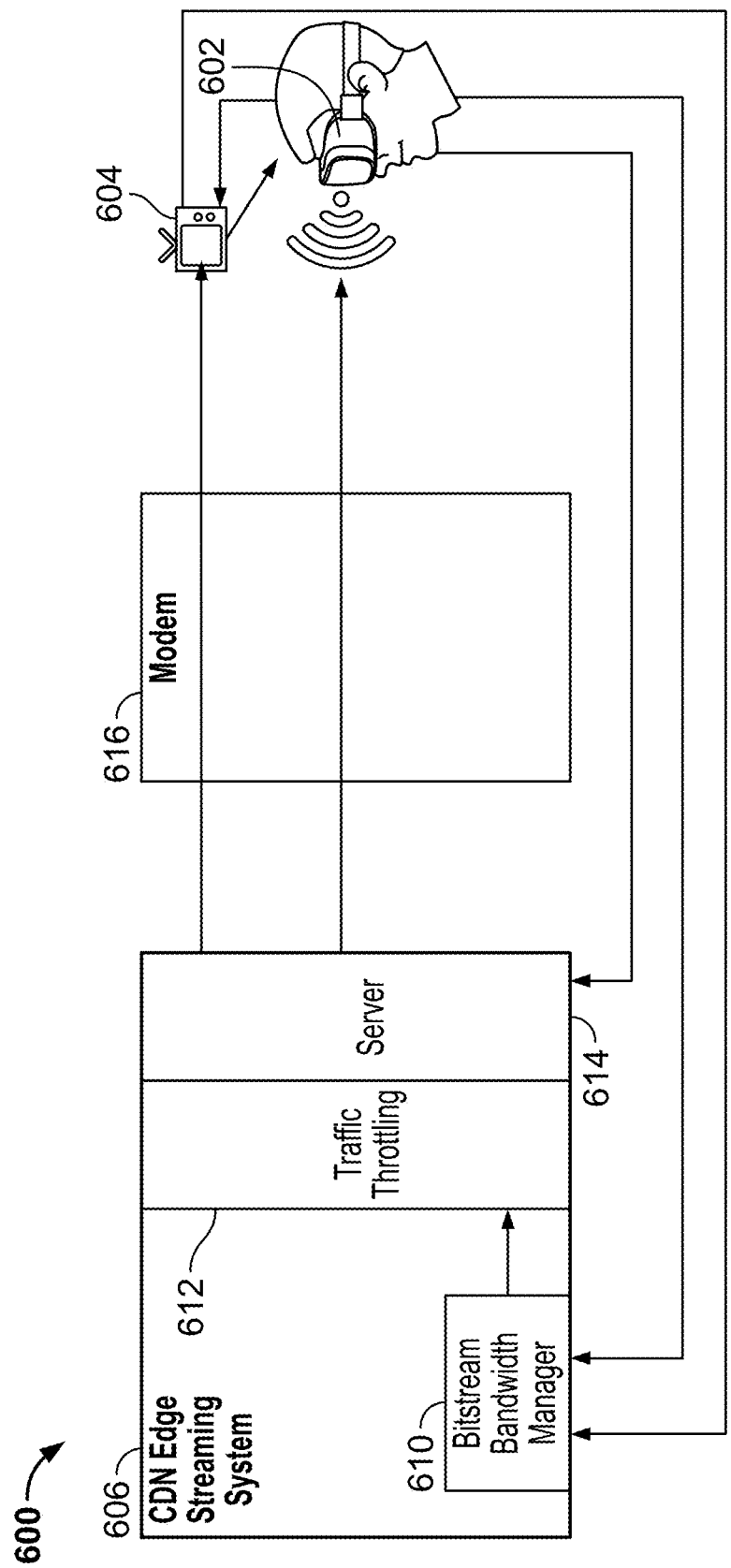
FIG. 6 shows another example environment in which display playback is controlled via an extended reality device, in accordance with some embodiments of the disclosure.

FIG. 6 shows another example environment in which display playback is controlled via an extended reality device, in accordance with some embodiments of the disclosure. Environment 600 comprises an extended reality device 602, a physical television 604, a content delivery network (CDN) edge streaming system 606 and a modem 608. In some examples, the modem may be a router in addition to, or instead of, a modem. As described above, the physical television 604 receives a content item stream that can be controlled via extended reality device 602. The physical television 604 may run an application, such as an OTT application, or may be connected with a display-less OTT streaming device, such as an Amazon Fire TV Stick. Bandwidth may be managed via a suitable algorithm, such as one for managing flow control for OTT devices. In addition, the extended reality device 602 receives content item streams that are used to generate virtual displays.

CDN edge streaming system 606 comprises traffic throttling module 612; server 614, which may be an HTTP server; and bitstream bandwidth manager 610. The CDN edge streaming system 606 streams a plurality of channels, each channel comprising a plurality of segments, to modem 616. The streams are transmitted from the server 614 to the physical television 604 (or the device connected to the physical television 604) and the extended reality device 602, for the virtual displays. Factors, or weights, are generated at the extended reality device 602 in the manner described in connection with FIG. 2. Pause and quality change requests are transmitted to the CDN edge streaming system 606, where they are actioned via the bitstream bandwidth manager 610. Quality change requests are transmitted to traffic throttling module 612, where they are actioned. The traffic throttling module 612 may also take into account additional throttling instructions, for example, an upper bandwidth limit set by a service provider. In some examples, a modeled pipe of the available bandwidth to the modem 616 may be modelled via a bandwidth estimation tool and/or defined via a user setting in an application.

Figure 7:
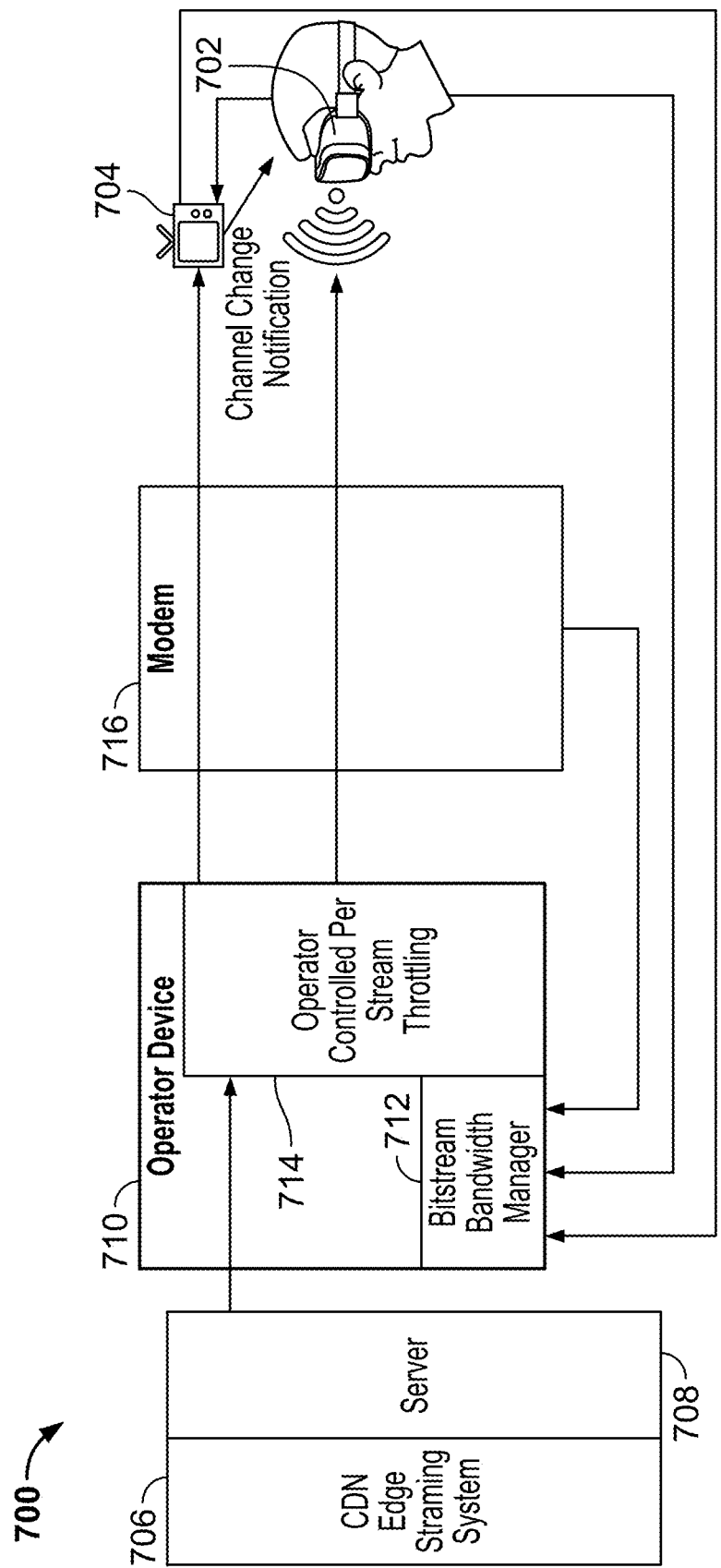
FIG. 7 shows another example environment in which display playback is controlled via an extended reality device, in accordance with some embodiments of the disclosure.

FIG. 7 shows another example environment in which display playback is controlled via an extended reality device, in accordance with some embodiments of the disclosure. Environment 700 comprises an extended reality device 702, a physical television 704, a content delivery network (CDN) edge streaming system 706, an operator device 710 and a modem 716. In some examples, the modem may be a router in addition to, or instead of, a modem. As described above, the physical television 704 receives a content item stream that can be controlled via extended reality device 702. The physical television 704 may run an application, such as an OTT application, or may be connected with a display-less OTT streaming device, such as an Amazon Fire TV Stick. Bandwidth may be managed via a suitable algorithm, such as one for managing flow control for OTT devices. In addition, the extended reality device 702 receives content item streams that are used to generate virtual displays.

CDN edge streaming system 706 comprises server 708, which may be an HTTP server. A plurality of streams, each comprising a plurality of segments, are transmitted from the CDN edge streaming system 706 to the operator device 710. The operator device 710 may comprise, for example, a broadband network gateway, a cable model termination system and/or a 5G edge device. The operator device comprises an operator-controlled per stream throttling module 714 and a bitstream bandwidth manager 712. The streams are transmitted from the operator device 710 to the physical television 704 (or the device connected to the physical television 704) and the extended reality device 702, for the virtual displays. Factors, or weights, are generated at the extended reality device 702 in the manner described in connection with FIG. 2. Pause and quality change requests are transmitted to the operator device 710, where they are actioned via bitstream bandwidth manager 612. Quality change requests are transmitted to operator-controlled per stream throttling module 714, where they are actioned. The operator-controlled per stream throttling module 714 may also take into account additional throttling instructions, for example, an upper bandwidth limit set by a service provider.

Figure 8:
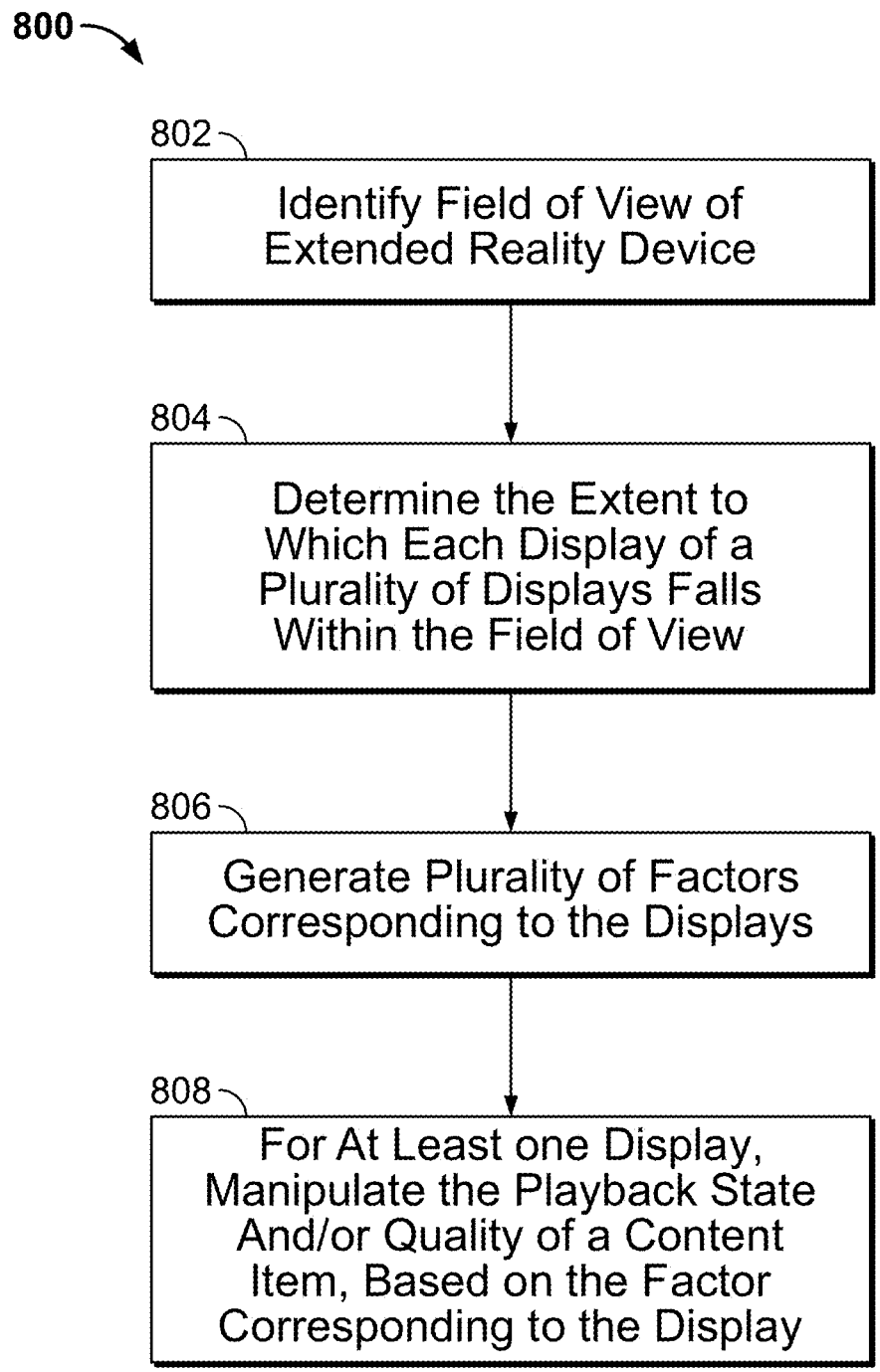
FIG. 8 shows a flowchart of illustrative steps involved in controlling display playback via an extended reality device, in accordance with some embodiments of the disclosure.

FIG. 8 shows a flowchart of illustrative steps involved in controlling display playback via an extended reality device, in accordance with some embodiments of the disclosure. Process 800 may be implemented on any of the aforementioned computing devices (e.g., extended reality device 202, 302, 402, 502, 602, 702). In addition, one or more actions of the process 800 may be incorporated into or combined with one or more actions of any other process or embodiments described herein.

At 802, a field of view of an extended reality device is identified. At 804, the extent to which each display of a plurality of displays falls within the field of view of the extended reality device is determined. At 806, a plurality of factors corresponding to the displays are generated. At 808, for at least one display of the plurality of displays, the playback state and/or quality of a content item is manipulated, based on the factor corresponding to the display.

Figure 9:
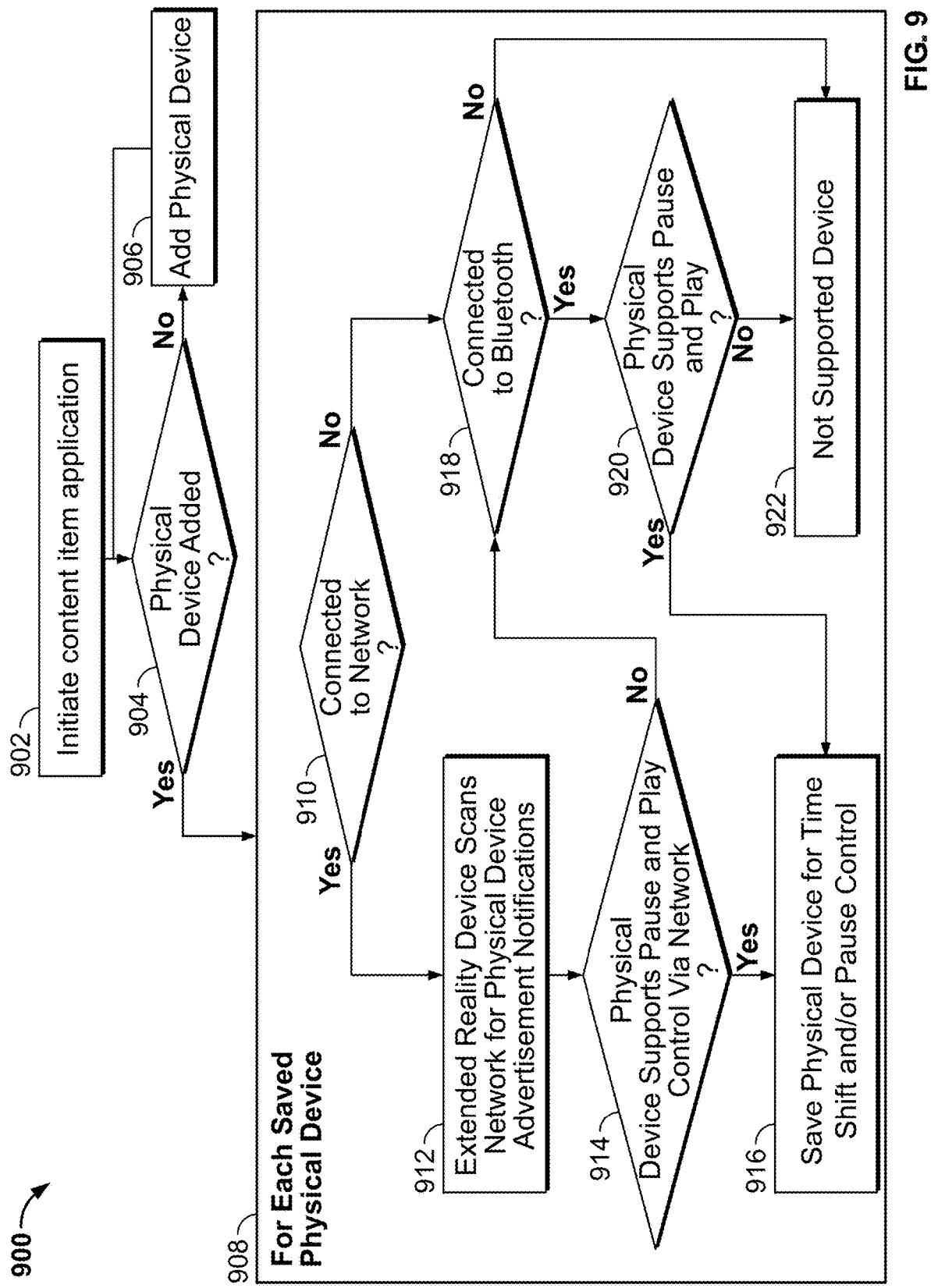
FIG. 9 shows another flowchart of illustrative steps involved in controlling display playback via an extended reality device, in accordance with some embodiments of the disclosure.

FIG. 9 shows another flowchart of illustrative steps involved in controlling display playback via an extended reality device, in accordance with some embodiments of the disclosure. Process 900 may be implemented on any of the aforementioned computing devices (e.g., extended reality device 202, 302, 402, 502, 602, 702). In addition, one or more actions of the process 900 may be incorporated into or combined with one or more actions of any other process or embodiments described herein.

The actions of process 900 may be used, for example, to set up a physical computing device for controlling playback, including time shifting and/or pausing a content item, via the field of view of an extended reality device. Pausing a content item may comprise receiving a content item via VOD and pausing the VOD content item. Such a physical computing device may include, for example, a smart television, a device that receives content items via cable and/or internet protocol TV (IPTV), an OTT set-top box and/or a smart television device without a display that connects to a second computing device via HDMI, such as an Amazon Firestick. At 902, a content item application is initiated on a computing device. In some examples, the application may be initiated by a user. In other examples, the application may be initiated by a second computing device. At 904, it is determined whether one or more physical devices have been added. If it is determined that a physical device has not been added, at 906, the physical device is added, and the process loops back to 904. If is determined that a physical device has been added, the process proceeds to 908. At 910, it is determined whether the physical device is connected to a network, such as a local network that may be wired, wireless and/or a combination of wired and wireless networks.

If it is determined that the physical device is connected to a network, at 912, an extended reality device scans the network for physical device advertisement notifications. At 914, it is determined whether the physical device supports pause and play control via the network. If it is determined that the physical device supports pause and play control via the network, at 916, the physical device is saved for time shift and/or pause control. If it is determined, at 910, that the physical device is not connected to a network, the process proceeds to 918. At 918, it is determined whether the physical device is connected to Bluetooth. If it is determined, at 914, that the physical device does not support pause and play control via the network, again it is determined, at 918, whether the physical device is connected to Bluetooth. If the device is connected to Bluetooth, at 920, it is determined whether the physical device supports pause and play. If it is determined, at 920, that the physical device does support pause and play, at 916, the physical device is saved for time shift and/or pause control. If it is determined, at 918, that the device is not connected to Bluetooth, it is determined, at 922, that the physical device is not a supported device. If it is determined, at 920, that the physical device does not support pause and play, it is determined at 922, that the physical device is not a supported device.

Figure 10:
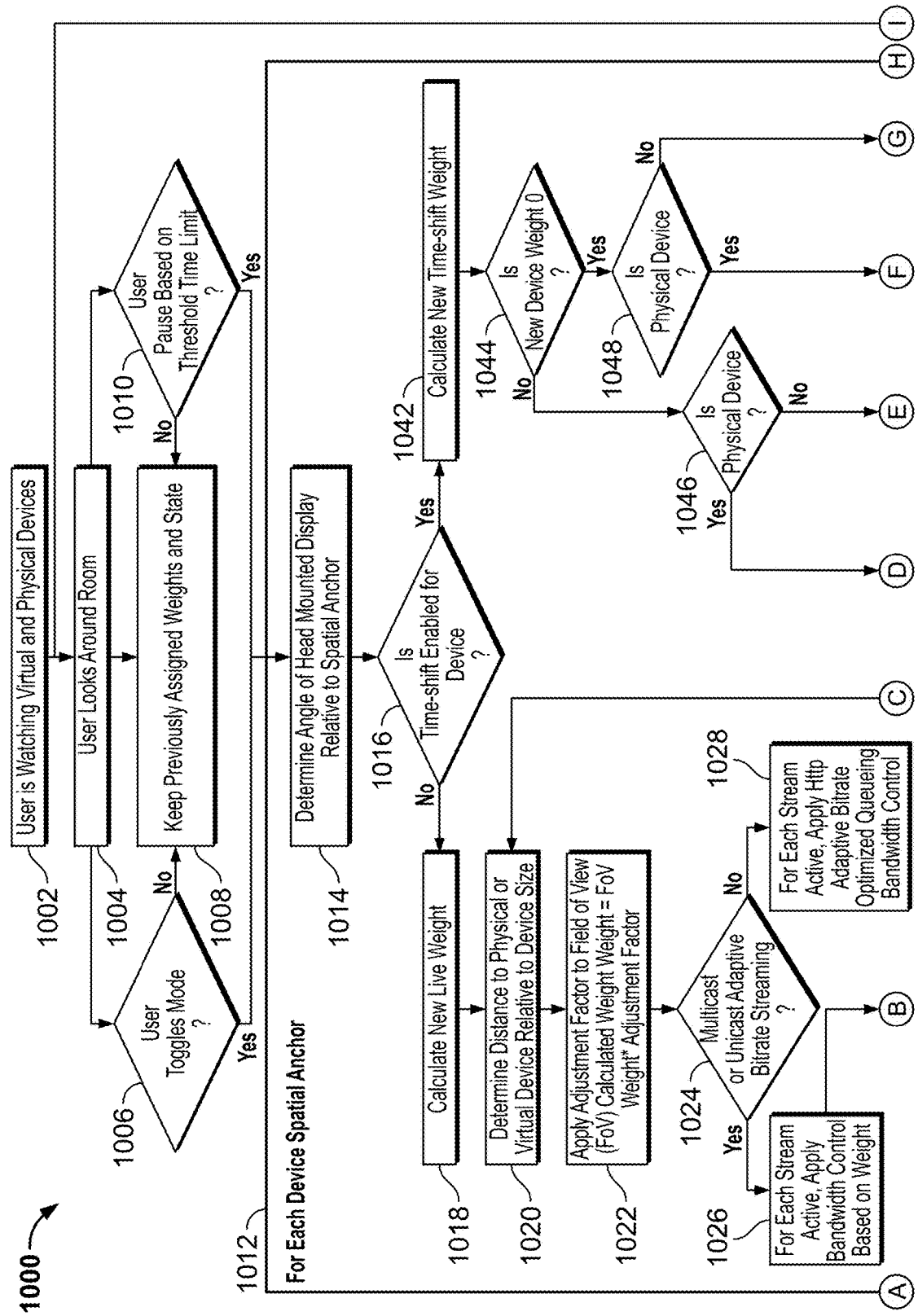
FIG. 10 shows another flowchart of illustrative steps involved in controlling display playback via an extended reality device, in accordance with some embodiments of the disclosure.
Figure 10:
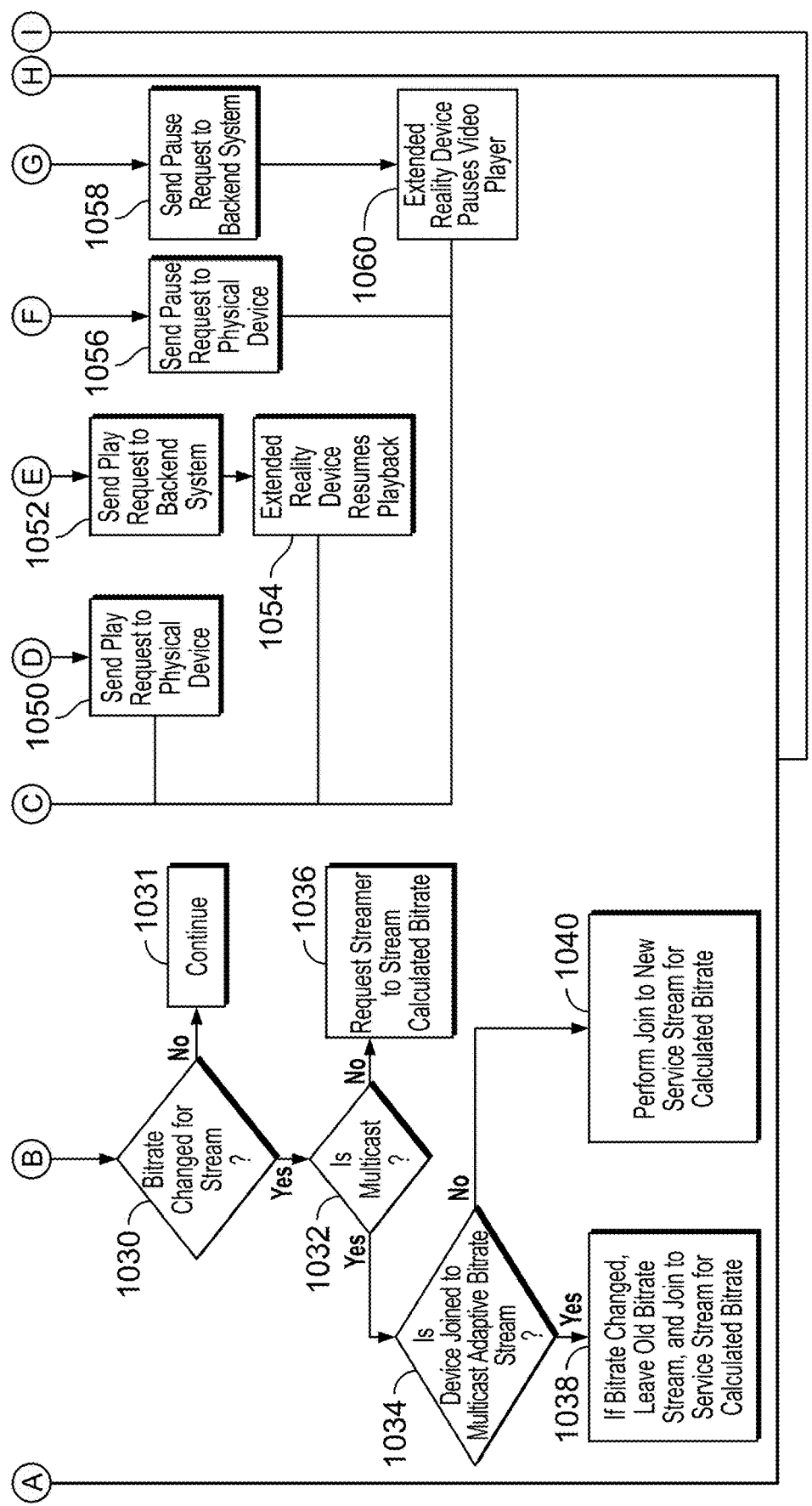

FIG. 10 shows another flowchart of illustrative steps involved in controlling display playback via an extended reality device, in accordance with some embodiments of the disclosure. Process 1000 may be implemented on any of the aforementioned computing devices (e.g., augmented reality device 202, 302, 402, 502, 602, 702). In addition, one or more actions of the process 1000 may be incorporated into or combined with one or more actions of any other process or embodiments described herein.

Process 1000 enables factors, or weights, to be generated and assigned to physical and virtual devices by an extended reality device. Based on these factors, bandwidth adjustments can be performed based on field-of-view changes of the extended reality device, and the subsequent resulting change in the generated factors. The factors can be generated in different manners, depending on if a physical, or virtual, device is in a pause mode, or a live mode. The bandwidth for devices in pause mode may be controlled by setting the factor, or weight, for paused devices to zero, which will free allocated bandwidth in any bandwidth management system. The factors may also be used to toggle the device from a pause to a play mode when the device is in a pause mode. For all devices in a time shift television mode, the bandwidth factor can be used to place the time shift device or VOD device in pause or play mode. In some examples, only time shift television-enabled devices, or devices playing VOD content, receive a factor of zero for freeing up allocated bandwidth.

Process 1000 starts at 1002 with a user watching content items on virtual and physical devices via an extended reality device. At 1004, it is detected that a user looks around the room. At 1006, it is determined whether the user toggles the play/pause mode of a device. At 1010, it is determined whether a user pauses based on a threshold time limit. If the determination at 1006 or 1010 is negative, i.e., that the mode has not been toggled and that there is not a pause based on a threshold time limit, the previously assigned factors, or weights, and state (i.e., pause and/or play state) are retained at 1008. If it is determined, at 1006, that the mode has been toggled, or a user pause based on a threshold time limit has been initiated at 1010, the process proceeds to 1012 for each device spatial anchor. Device spatial anchors are discussed in connection with FIG. 2 above. At 1014, an angle of the head-mounted display of the extended reality device, relative to the spatial anchor, is determined. At 1016, it is determined whether time shift is enabled for the device. If time shift is not enabled, at 1018, a new weight, or factor, is calculated for the device displaying live content. At 1020, a distance to the physical, or virtual-device relative to the device size is determined.

At 1022, an adjustment factor is applied to the field-of-view calculated weight, or factor, where the weight, or factor, is the field-of-view weight multiplied by the adjustment factor. At 1024, it is determined whether the streaming is MABR or UABR streaming. At 1026, if it is determined that the streaming is MABR or UABR, for each active stream, bandwidth control is applied based on weight. At 1028, if it is determined that the streaming is not MABR or UABR, for each stream active, HTTP adaptive bitrate optimized queueing bandwidth control is applied. At 1030, it is determined whether the bitrate has been changed for each stream. If the bitrate has not been changed, the stream continues at 1031. If the bitrate has been changed, it is determined, at 1032, whether the stream is multicast. If the stream is not multicast, the streamer is requested, at 1036, to stream the calculated bitrate. If the stream is multicast, it is determined, at 1034, whether the device is joined to a MABR stream. If the device is connected to a MABR stream, at 1038, if the bitrate has changed, the device leaves the old bitrate stream and joins to a service stream for the calculated bitrate. If the device is not connected to a MABR stream, at 1040, a-join-to-a-new-service-stream is performed for the calculated bitrate.

If, at 1016, it is determined that time shift is enabled for the device, a new time shift weight is calculated at 1042. At 1044, it is determined whether the weight, or factor, is zero. If the weight, or factor, is not zero, at 1046, it is determined whether the device is a physical device. If the device is a physical device, a play request is sent, at 1050, to the physical device and the process proceeds to 1020 and continues as described above. If the device is not a physical device, a play request is sent to a backend system at 1052 and the extended reality device resumes playback at 1054. The process proceeds to 1020 and continues as described above. If, at 1044, it is determined that the new device weight is zero, at 1048 it is determined whether the device is a physical device. If the device is a physical device, a pause request is sent to the physical device at 1056 and the process proceeds to 1020 and continues as described above. If, at 1048, it is determined that the device is not a physical device, a pause request is sent to a backend system at 1058 and the extended reality device pauses the video player at 1060. The process proceeds to 1020 and continues as described above.

FIG. 11 shows another flowchart of illustrative steps involved in controlling display playback via an extended reality device, in accordance with some embodiments of the disclosure. Process 1100 may be implemented on any of the aforementioned computing devices (e.g., augmented reality device 202, 302, 402, 502, 602, 702). In addition, one or more actions of the process 1100 may be incorporated into or combined with one or more actions of any other process or embodiments described herein.

Typically, an augmented reality device is used to control a pause mode on a plurality of physical and, optionally, virtual displays. The augmented reality device passes through the physical display, or displays, through an optical component and generates any virtual displays. The actions of process 1100 may be used, for example, to toggle a pause mode, such as time shift and/or a live television mode for virtual television content items, physical television content items and/or content items received via a set-top box. When toggling the pause mode on or off, the system may dynamically reallocate bandwidth to different devices, for example, based on the new calculations of weights and/or factors. In addition, the system may also perform switching modes on a server. In the case of physical devices, an API may be available for this functionality at the physical device and/or via an application API that will trigger the server to switch modes. In the extended reality device, for virtual displays, the APIs may have to be implemented directly on the server.

At 1102, a user looks at a physical or virtual device via an extended reality device. At 1104, a user selects a physical or virtual device to toggle a pause mode. For example, pausing a content item may comprise pausing a content item via time shift and/or receiving a content item via VOD and pausing the VOD content item. The user may select the device via a hand gesture, and/or via a controller of the augmented reality device. In some examples, a device may be selected via voice control to toggle a pause mode and/or by looking directly at the physical or virtual device. A user may utilize a voice control mode by, for example, saying the words "time-shift mode on" "pause mode on," "time-shift mode off," and/or "pause mode off." At 1106, it is determined whether the device is currently in a pause mode, and the device is toggled to a respective non-paused mode and/or paused mode. In some examples, the toggling may be implemented via a virtual toggle, or icon, placed in the extended reality space below the device to toggle the pause mode. If the device is currently in pause mode, at 1108 the device is toggled to be in a non-paused mode. A non-paused mode may comprise the device receiving live content via terrestrial, cable and/or OTT. At 1110, it is determined whether the content is delivered via unicast adaptive bitrate. At 1112, if the content is delivered via unicast adaptive bitrate, service multicast stream addresses for bitrates per multicast for service are retrieved, and once the retrieved stream addresses at 1112 are received, the method defined in FIG. 9 is executed at 1114. If it is determined, at 1110, that the delivery is not unicast adaptive bitrate at 1114, the method defined in FIG. 9 is executed.

If, at 1106, it is determined that the physical device is not in pause mode, the device is toggled to be in a pause mode at 1116. At 1118, it is determined whether the delivery is multicast adaptive bitrate. If the delivery is multicast adaptive bitrate, at 1120 the multicast stream is left. At 1122, a unicast streaming address is connected to and the device waits on the unicast stream and at 1114, and the method defined in FIG. 9 is executed. If, at 1118, it is determined that the delivery is not multicast adaptive bitrate, the process proceeds to 1114 where the method of FIG. 9 is executed.

FIG. 12 shows a block diagram representing computing device components and dataflow therebetween for controlling display playback via an extended reality device, in accordance with some embodiments of the disclosure. Computing device 1200 (e.g., augmented reality device 202, 302, 402, 502, 602, 702), as discussed above, comprises input circuitry 1204, control circuitry 1208 and output circuitry 1226. Control circuitry 1208 may be based on any suitable processing circuitry (not shown) and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

Input is received 1202 by the input circuitry 1204. The input circuitry 1204 is configured to receive inputs related to a computing device. For example, this may be via gesture detected via an extended reality device. In other examples, this may be via an infrared controller, Bluetooth and/or Wi-Fi controller of the computing device 1200, a touchscreen, a keyboard, a mouse and/or a microphone. In another example, the input may comprise instructions received via another computing device. The input circuitry 1204 transmits 1206 the user input to the control circuitry 1208.

The control circuitry 1208 comprises a field-of-view identification module 1210, a display within field-of-view determination module 1214, a factor generation module 1218, and a state or quality of playback manipulation module 1222. The input is transmitted to the field of view identification module 1210, where a field-of-view of an extended reality device is determined. An indication of the field-of-view is transmitted 1212 to the display within field of view determination module 1214, where it is determined if, and how many, displays fall within the field of view. An indication of the displays that fall within the field of view is transmitted 1216 to the factor generation module 1218, where factors are generated for each of the identified displays based on the extent to which the display or displays fall within the field of view. The factors are transmitted 1220 to the state or quality of playback manipulation module 1222 where instructions to manipulate a state and/or quality of playback of at least one of the identified displays are generated. These instructions are transmitted 1224 to the output circuitry 1226, where the content item generation module 1228 generates the content item for display based on the instructions from the playback manipulation module 1222.

In other example systems, the displays may be displays of a video conferencing system. Each display may show one or more participants of the video conference. In the manner described above, different displays, or participants, may be paused based on generated factors, or weights, that are generated based on a field of view of an extended reality device. In addition, the bandwidth associated with one or more of the displays, or participants, may be varied based on the generated weights, or factors.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:
   identifying, at a computing device, a field of view of an extended reality display device;

identifying, at the computing device, a plurality of displays that fall within the field of view of the extended reality display device, wherein the plurality of displays comprises at least one physical display;

determining, at the computing device and for each display of the plurality of displays, a size of a portion of each display that falls within the field of view of the extended reality display device;

generating, at the computing device and for each display of the plurality of displays, a bandwidth factor based at least in part on the determined size of the portion of the display that falls within the field of view;

for at least one display of the plurality of displays, reducing a quality of playback of a content item in a manner responsive to the size of the portion of the at least one display that falls within the field of view, based at least in part on the bandwidth factor corresponding to the display; and generating, for playback at the at least one display, the content item at the reduced quality.

2. The method of claim 1, wherein the plurality of displays comprises only physical displays.

3. The method of claim 1, wherein the plurality of displays comprises a virtual display generated by the extended reality display device.

4. The method of claim 1, wherein:
the extended reality display device comprises an optical see-through component; and
a physical display of the plurality of displays falls within the field of view and is visible by way of the optical see-through component.

5. The method of claim 1, wherein:
the extended reality display device comprises a video see-through component; and
a physical display of the plurality of displays falls within the field of view and is visible by way of the video see-through component.

6. The method of claim 1, wherein the generating the bandwidth factor further comprises generating, for each display of at least a subset of the plurality of displays, a binary value that indicates whether the display falls within the field of view of the extended reality display device.

7. The method of claim 1, wherein the generating the bandwidth factor further comprises generating, for each display of at least a subset of the plurality of displays, an offset angle between a center of focus of the extended reality display device and the display.

8. The method of claim 1, further comprising, for each display of at least a subset of the plurality of displays, determining a distance from the extended reality display device to the display, and wherein the generating the bandwidth factor further comprises, for each display, generating the bandwidth factor based on the determined distance.

9. The method of claim 1, further comprising, for each display of at least a subset of the plurality of displays, determining a bitrate of the content item playing at the display, and wherein the generating the bandwidth factor further comprises, for each display, generating the bandwidth factor based on the determined bitrate.

10. The method of claim 1, further comprising, for each display of at least a subset of the plurality of displays, changing a bandwidth allocated to delivering the content item to the display based on the bandwidth factor corresponding to the display.

11. The method of claim 1, wherein the reducing the quality of playback of the content item at the display further comprises receiving a manifest file identifying a maximum quality for a segment of the content item, wherein the maximum quality is based on the bandwidth factor corresponding to the display.

12. The method of claim 1, further comprising generating a virtual user interface for display at the extended reality display device.

13. The method of claim 1, further comprising generating, for each display of at least a subset of the plurality of displays, a virtual label for display at the extended reality display device, wherein the virtual label indicates a state of playback of the content item.

14. The method of claim 1, at least one of the plurality of displays is configured to output the content item comprising a stream from a video conference.

15. A system comprising:
a communication port;
a memory storing instructions; and
control circuitry communicably coupled to the memory and the communication port and configured to execute instructions to:
identify, at a computing device, a field of view of an extended reality display device;
identify, at the computing device, a plurality of displays that fall within the field of view of the extended reality display device, wherein the plurality of displays comprises at least one physical display;
determine, at the computing device and for each display of the plurality of displays, a size of a portion of each display that falls within the field of view of the extended reality display device;
generate, at the computing device and for each display of the plurality of displays, a bandwidth factor based at least in part on the determined size of the portion of the display that falls within the field of view;
for at least one display of the plurality of displays, reduce a state or quality of playback of a content item in a manner responsive to the size of the portion of the at least one display that falls within the field of view, based at least in part on the bandwidth factor corresponding to the display; and
generate, for playback at the at least one display, the content item at the reduced quality.

16. The system of claim 15, wherein the control circuitry configured to generate the bandwidth factor is further configured to generate, for each display of at least a subset of the plurality of displays, a binary value that indicates whether the display falls within the field of view of the extended reality display device.

17. The system of claim 15, wherein the control circuitry configured to generate the bandwidth factor is further configured to generate, for each display of at least a subset of the plurality of displays, an offset angle between a center of focus of the extended reality display device and the display.

18. The system of claim 15, wherein:
the control circuitry is further configured to, for each display of at least a subset of the plurality of displays, determine a distance from the extended reality display device to the display; and
the control circuitry configured to generate the bandwidth factor is further configured to, for each display, generate the bandwidth factor based on the determined distance.

19. The system of claim 15, wherein:
the control circuitry is further configured to, for each display of at least a subset of the plurality of displays, determine a bitrate of the content item playing at the display; and the control circuitry configured to generate the bandwidth factor is further configured to, for each display, generate the bandwidth factor based on the determined bitrate.

\* \* \* \* \*